US010754106B2

(12) United States Patent
Morioka et al.

(10) Patent No.: US 10,754,106 B2
(45) Date of Patent: Aug. 25, 2020

(54) OPTICAL RECEPTACLE, OPTICAL MODULE AND METHOD FOR PRODUCING OPTICAL MODULE

(71) Applicant: Enplas Corporation, Saitama (JP)

(72) Inventors: Shimpei Morioka, Saitama (JP); Ayano Kon, Saitama (JP); Koki Ono, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/090,334

(22) PCT Filed: Feb. 24, 2017

(86) PCT No.: PCT/JP2017/007102
§ 371 (c)(1),
(2) Date: Oct. 1, 2018

(87) PCT Pub. No.: WO2017/169390
PCT Pub. Date: Oct. 5, 2017

(65) Prior Publication Data
US 2019/0121037 A1  Apr. 25, 2019

(30) Foreign Application Priority Data

Mar. 30, 2016 (JP) .................... 2016-068398

(51) Int. Cl.
*G02B 6/42* (2006.01)
(52) U.S. Cl.
CPC ............ *G02B 6/4214* (2013.01); *G02B 6/42* (2013.01); *G02B 6/4244* (2013.01); *G02B 6/4249* (2013.01); *G02B 6/4292* (2013.01)
(58) Field of Classification Search
CPC ...... G02B 6/4244; G02B 6/4214; G02B 6/42; G02B 6/4292; G02B 6/4249; G02B 6/423; G02B 6/4255
(Continued)

(56) References Cited

U.S. PATENT DOCUMENTS

| 5,023,447 A | 6/1991 | Masuko et al. |
| 5,515,468 A | 5/1996 | DeAndrea et al. |
| 8,727,641 B2 | 5/2014 | Hung |

(Continued)

FOREIGN PATENT DOCUMENTS

| CN | 103576259 A | 2/2014 |
| CN | 103744148 A | 4/2014 |

(Continued)

OTHER PUBLICATIONS

Extended European Search Report dated Oct. 28, 2019 from EP Application No. 17773935.6, 9 pages.

(Continued)

*Primary Examiner* — Michael P Mooney
(74) *Attorney, Agent, or Firm* — Brundidge & Stanger, P.C.

(57) ABSTRACT

The optical receptacle of the present invention comprises an optical receptacle body and a support member. The optical receptacle body comprises: a first optical surface upon which is incident light transmitted from the photoelectric conversion element; a second optical surface that emits light transmitted from the photoelectric conversion element to the light transmission medium. The support member comprises a support member body that includes a mounting surface for mounting on a substrate, and a second mating part that mates with the first mating part and that is positioned at a position on the inside of the support member body at a position corresponding to the first mating part. The optical receptacle is positioned on the support member side of the mounting surface.

12 Claims, 5 Drawing Sheets

(58) Field of Classification Search
USPC .................................... 385/14, 31, 49–94
See application file for complete search history.

(56) References Cited

U.S. PATENT DOCUMENTS

| | | |
|---|---|---|
| 2004/0202477 A1 | 10/2004 | Nagasaka et al. |
| 2009/0252455 A1* | 10/2009 | Ohta .................... G02B 6/4214 |
| | | 385/42 |
| 2013/0230327 A1 | 9/2013 | Shin |
| 2014/0093204 A1 | 4/2014 | Kuo |
| 2014/0126864 A1 | 5/2014 | Isuzuki et al. |
| 2014/0169735 A1 | 6/2014 | Kuo |
| 2014/0185984 A1 | 7/2014 | Hung |
| 2014/0233897 A1 | 8/2014 | Ishikawa |
| 2015/0131947 A1 | 5/2015 | Orioka et al. |
| 2017/0075082 A1 | 3/2017 | Aihara et al. |

FOREIGN PATENT DOCUMENTS

| | | |
|---|---|---|
| EP | 2772779 A1 | 9/2014 |
| JP | 03-021908 A | 1/1991 |
| JP | 06-273641 A | 9/1994 |
| JP | 2000-089065 A | 3/2000 |
| JP | 2004-246279 A | 9/2004 |
| JP | 2013-007986 A | 1/2013 |
| JP | 2013-544374 A | 12/2013 |
| JP | 2015-219273 A | 12/2015 |
| WO | 2013/183273 A1 | 12/2013 |

OTHER PUBLICATIONS

International Search Report from International Application No. PCT/JP2017/007102 dated May 30, 2017.

* cited by examiner

OPTICAL RECEPTACLE, OPTICAL MODULE AND METHOD FOR PRODUCING OPTICAL MODULE

TECHNICAL FIELD

The present invention relates to an optical receptacle, an optical module including the optical receptacle, and a method for producing the optical module.

BACKGROUND ART

Conventionally, in optical communications using an optical transmission member such as an optical fiber, an optical waveguide, and/or the like, an optical module including a light-emitting element (optical element) such as a surface-emitting laser (e.g., a vertical cavity surface emitting laser (VCSEL)) has been used. Such an optical module includes an optical receptacle (optical socket) that allows, to be incident on an end surface of the optical transmission member, light containing communication information and being emitted by the light-emitting element.

For example, Patent Literature (hereinafter, referred to as "PTL") 1 discloses an optical module including a board, an optical socket disposed on one surface of the board, and an optical element disposed on the other surface of the board at a position corresponding to the optical socket. An optical plug that supports an end of a tape fiber is attached to the optical socket. Moreover, the optical socket includes: a first lens that allows, to enter the inside of the optical socket, light emitted by the optical element, or allows, to be emitted toward the optical element, light emitted from the tape fiber and having traveled through the inside of the optical socket; a second lens that allows, to enter the inside of the optical socket, light emitted from the tape fiber, or allows, to be emitted toward the tape fiber, light emitted by the optical element and having traveled through the inside of the optical socket; and a reflective surface that reflects light incident on the first lens toward the second lens, or reflects light incident on the second lens toward the first lens.

In the optical module disclosed in PTL 1, the optical element is fixed on one surface of the board by wire bonding or the like. Then, the optical socket is fixed on the other surface of the board such that the optical axis of the optical element coincides with the central axis of the first lens. During fixation, an adhesive is applied to at least the optical socket or the board, and the optical socket is adhered to the board.

CITATION LIST

Patent Literature

PTL 1
Japanese Patent Application Laid-Open No. 2004-246279

SUMMARY OF INVENTION

Technical Problem

However, in the optical module disclosed in PTL 1, there has been a problem in that, since the optical socket is directly adhered to the board, the board on which the optical socket is fixed has a limited region for wire bonding and/or for other optical components, electronic components, and/or the like to be disposed.

An object of the present invention is therefore to provide an optical receptacle which, compared to the traditional optical socket, can achieve a greater number of degrees of freedom for designs of an optical-receptacle main body, wire bonding, other optical components, and electronic components. The present invention also intends to provide an optical module including this optical receptacle. The present invention further intends to provide a method for producing this optical module.

Solution to Problem

An optical receptacle according to the present invention is an optical receptacle configured to be disposed between a photoelectric conversion device and an optical transmission member, the photoelectric conversion device including a board and a photoelectric conversion element disposed on the board, the optical receptacle being configured to optically couple together the photoelectric conversion element and an end surface of the optical transmission member, and the optical receptacle includes: an optical-receptacle main body; and a supporting member configured to support the optical-receptacle main body. The optical-receptacle main body includes: a first optical surface configured to allow incidence of transmission light emitted by the photoelectric conversion element, and to emit, toward the photoelectric conversion element, reception light that has been emitted from the end surface of the optical transmission member and has passed through an inside of the optical-receptacle main body, a second optical surface configured to emit, toward the optical transmission member, the transmission light that has been emitted by the photoelectric conversion element and has passed through the inside of the optical-receptacle main body, and to allow incidence of the reception light emitted from the optical transmission member, and a first fitting portion disposed in or on a surface of the optical-receptacle main body other than in or on surfaces of the optical-receptacle main body at which the first optical surface and the second optical surface are disposed. The supporting member includes: a supporting-member main body including an installation surface for the supporting member to be installed on the board, and a second fitting portion disposed on an inner side of the supporting-member main body at a position corresponding to the first fitting portion, and fitted in or to the first fitting portion. The optical-receptacle main body is disposed on a side of the supporting member with respect to the installation surface.

An optical module according to the present invention includes: a photoelectric conversion device including a board and a photoelectric conversion element disposed on the board; and the optical receptacle according to the present invention, in which the board and the optical-receptacle main body are spaced apart from each other.

A method for producing an optical module according to the present invention is an method for producing the optical module according to the present invention, and includes: preparing the optical receptacle by fitting together the first fitting portion of the optical-receptacle main body and the second fitting portion of the supporting member; and fixing the optical receptacle to the photoelectric conversion device such that the board and the optical-receptacle main body are spaced apart from each other.

Advantageous Effects of Invention

According to the present invention, an optical receptacle and an optical module which, compared to the conventional optical socket, can achieve a greater number of degrees of freedom for designs of wire bonding, other optical components, electronic components, and/or the like can be provided.

DESCRIPTION OF EMBODIMENTS

Hereinafter, optical module 100 according to an embodiment of the present invention will be described in detail with reference to the attached drawings.

(Configuration of Optical Module)

Figure 1:
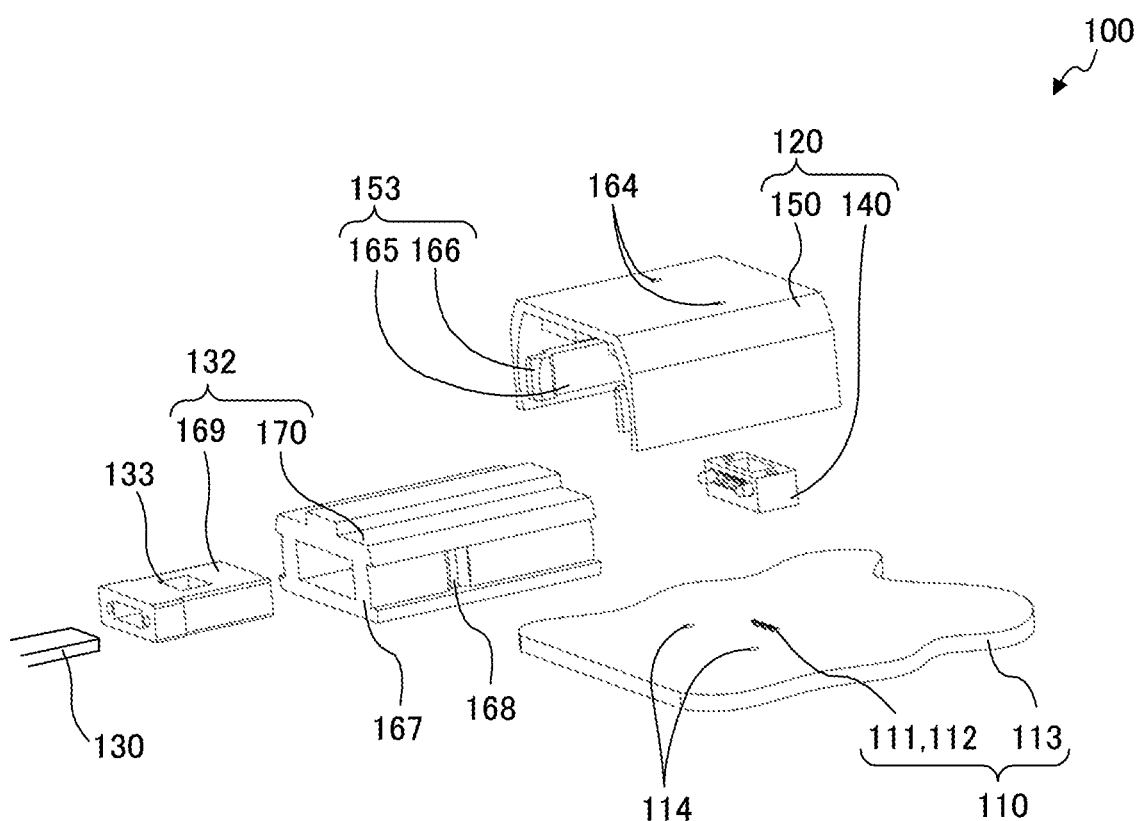
FIG. 1 is an exploded perspective view of an optical module according to one embodiment of the present invention.
Figure 2A:
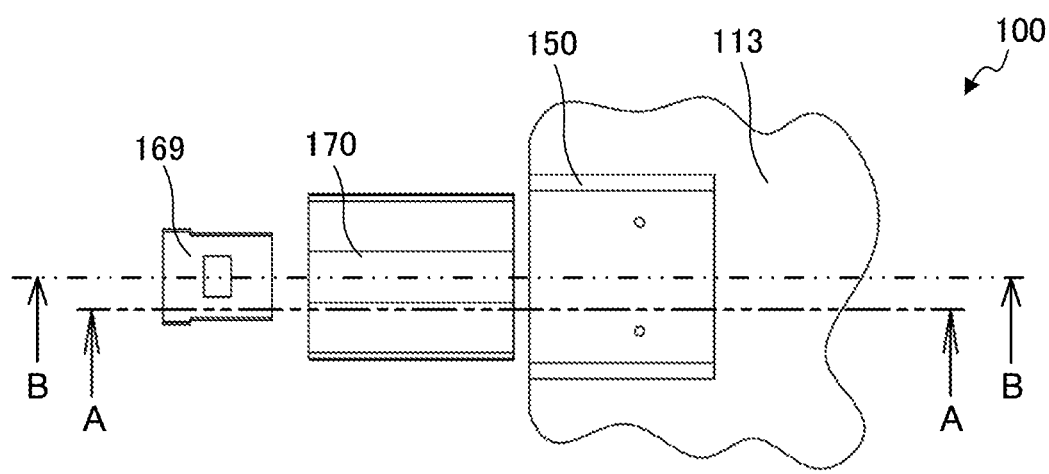
FIGS. 2A to 2C illustrate a configuration of the optical module.
Figure 2B:
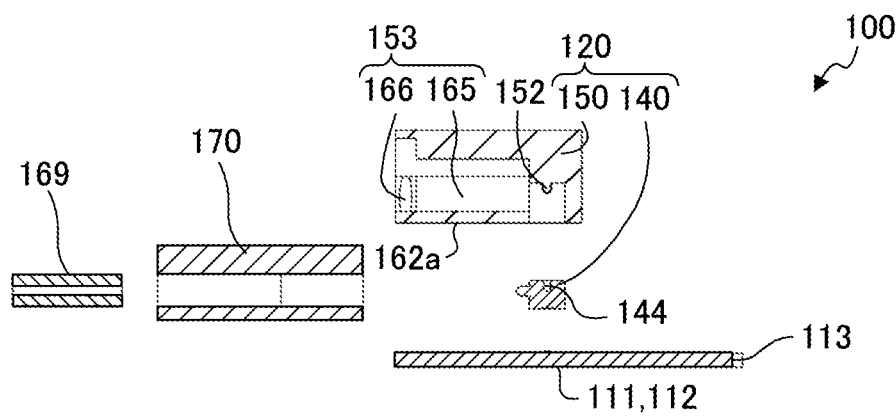
Figure 2C:
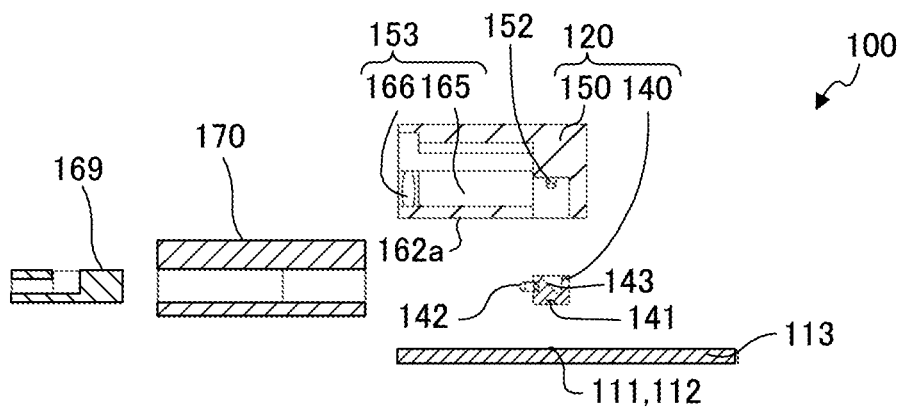

FIG. 1 is an exploded perspective view of optical module 100 according to one embodiment of the present invention. Note that FIG. 1 also illustrates optical transmission members 130 and ferrule 132. FIGS. 2A to 2C illustrate a configuration of the optical module. FIG. 2A is an exploded plan view of optical module 100, FIG. 2B is a sectional view taken along line A-A in FIG. 2A, and FIG. 2C is a sectional view taken along line B-B in FIG. 2A.

As illustrated in FIGS. 1 and 2A to 2C, optical module 100 includes board-mounted photoelectric conversion device 110 including photoelectric conversion elements, such as light-emitting elements 111, light-receiving elements 112, and/or the like; and optical receptacle 120. During the use of optical module 100, optical transmission members 130 are connected to optical receptacle 120.

Photoelectric conversion device 110 includes board 113 and the photoelectric conversion elements. In optical module 100 used for transmission, light-emitting elements 111 are used as the photoelectric conversion elements. Additionally or alternatively, in optical module 100 used for reception, light-receiving elements 112 are used as the photoelectric conversion elements. In addition, in optical module 100 used for transmission and reception, light-emitting elements 111 and light-receiving elements 112 are used as the photoelectric conversion elements. The descriptions of the embodiment of the present invention will be given in relation to optical module 100 which includes light-emitting elements 111 and light-receiving elements 112 and which is used for transmission and reception.

Board 113 is, for example, a glass composite board, glass epoxy board, flexible printed circuit board, or the like. Light-emitting elements 111 and light-receiving elements 112 are disposed on board 113. First alignment marks 114 are formed on the surface of board 113 on which light-emitting elements 111 and light-receiving elements 112 are disposed.

Light-emitting elements 111 are disposed on board 113, and emit laser light perpendicularly to the surface of board 113 on which light-emitting elements 111 are disposed. The number of light-emitting elements 111 is not particularly limited. Six light-emitting elements 111 are provided in the embodiment of the present invention. The positions of light-emitting elements 111 are also not particularly limited. In the embodiment of the present invention, six light-emitting elements 111 are aligned at fixed intervals along the alignment direction of optical transmission members 130. Light-emitting elements 111 are a vertical cavity surface emitting laser (VCSEL), for example. Note that, when optical transmission members 130 are aligned in two or more rows, the number of rows of aligned light-emitting elements 111 may be identical to that of optical transmission members 130.

Light-receiving elements 112 are disposed on board 113, and receive reception light emitted from optical transmission members 130. The number of light-receiving elements 112 is not particularly limited. Six light-receiving elements 112 are provided in the embodiment of the present invention. The positions of light-receiving elements 112 are also not particularly limited. In the embodiment of the present invention, six light-receiving elements 112 are aligned at fixed intervals in one row along the alignment direction of optical transmission members 130. Specifically, six light-receiving elements 112 are aligned such that six light-emitting elements 111 and six light-receiving elements 112 are situated on the same straight line. Light-receiving elements 112 are, for example, a photodiode (PD). Note that, when optical transmission members 130 are aligned in two or more rows, the number of rows of aligned light-receiving elements 112 may be identical to that of optical transmission members 130.

First alignment marks 114 are used for the below-mentioned positioning of optical module 100, and serve as a basis for positioning optical receptacle 120 to board 113. The configuration of first alignment marks 114 is not particularly limited as long as first alignment marks 114 can fulfil the above-mentioned function. First alignment marks 114 may be recesses formed in board 113, protrusions formed on board 113, or marks provided by painting. In addition, the shape of each of first alignment marks 114 as seen in plan view is not particularly limited, and may be circular or polygonal. The arrangement of first alignment marks 114 is not also limited. First alignment marks 114 may be disposed on the side of optical transmission members 130 or on the side opposite to optical transmission members 130 as seen from the photoelectric conversion elements (light-emitting elements 111 and light-receiving elements 112). In the embodiment of the present invention, first alignment marks 114 are disposed on the side of optical transmission members 130 as seen from the photoelectric conversion elements (light-emitting elements 111 and light-receiving elements 112).

The type of optical transmission members 130 is not particularly limited, and examples of optical transmission members 130 include an optical fiber, optical waveguide, and the like. Optical transmission members 130 are an optical fiber in the embodiment of the present invention. In addition, the optical fiber may be of a single mode type, or a multiple mode type. The number of optical transmission members 130 is not particularly limited. Twelve optical fibers are aligned in a row at fixed intervals in the embodiment of the present invention. Note that, optical transmission members 130 may also be aligned in two or more rows.

Ferrule 132 holds ends of optical transmission members 130, and also positions the end surfaces of optical transmission members 130 to second optical surfaces 142 of optical-receptacle main body 140. Ferrule 132 includes ferrule main body 169 for holding optical transmission members 130, and ferrule housing 170 for connecting together ferrule main body 169 and supporting member 150. Ferrule main body 169 can hold the ends of optical transmission members 130, and is freely detachably attached to ferrule housing 170. Optical transmission members 130 are fixed to ferrule main body 169 by inserting optical transmission members 130 into the hollow region of ferrule main body 169 and pouring an adhesive from adhesive inlet 133 into ferrule main body 169. Ferrule housing 170 is formed to be cylindrical. Ferrule main body 169 in which optical transmission members 130 are held is inserted into the hollow region of ferrule housing 170. Detachably-attaching linear recesses 167 and detachably-attaching recesses 168 that are complementary in shape to detachably-attaching protrusions 166 used for attachment and detachment of supporting member 150 are formed in the external lateral surfaces of ferrule housing 170.

Disposed between photoelectric conversion device 110 and optical transmission members 130, optical receptacle 120 optically couples together the light-emitting surfaces of a plurality of light-emitting elements 111 and the end surfaces of a plurality of optical transmission members 130, respectively. Optical receptacle 120 also optically couples together the light-receiving surfaces of a plurality of light-receiving elements 112 and the end surfaces of a plurality of optical transmission members 130, respectively. Optical receptacle 120 includes optical-receptacle main body 140 and supporting member 150 that supports optical-receptacle main body 140. Hereinbelow, the configuration of optical receptacle 120 is described in detail.

(Configuration of Optical Receptacle)

Figure 3A:
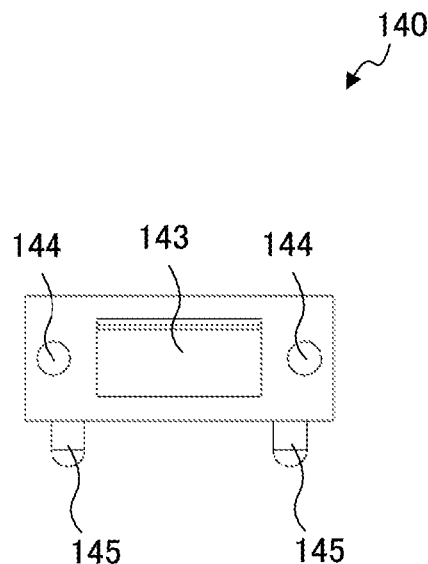
FIGS. 3A to 3D illustrate a configuration of an optical-receptacle main body.
Figure 3B:
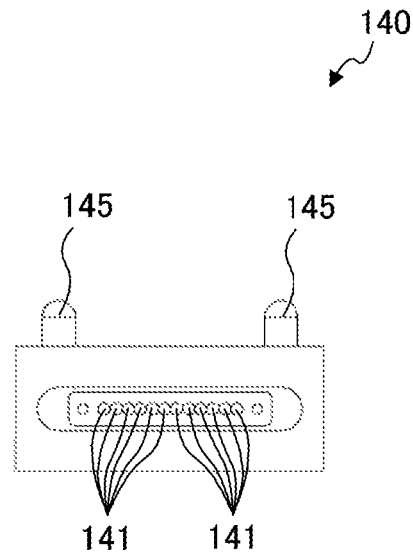
Figure 3C:
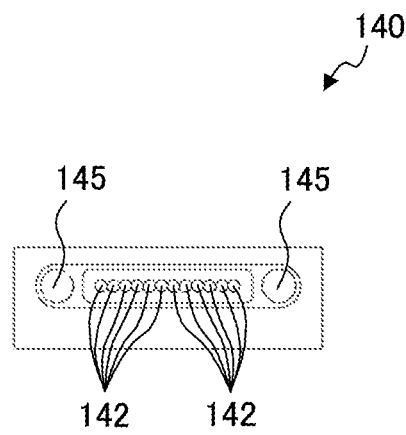
Figure 3D:
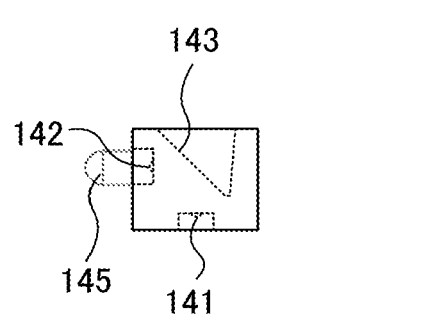

FIGS. 3A to 3D illustrate the configuration of optical-receptacle main body 140. FIG. 3A is a plan view of optical-receptacle main body 140, FIG. 3B is a bottom view of optical-receptacle main body 140, FIG. 3C is a front view of optical-receptacle main body 140, and FIG. 3D is a right side view of optical-receptacle main body 140.

As illustrated in FIGS. 3A to 3D, optical-receptacle main body 140 is a member having a substantially rectangular parallelepiped shape. Optical-receptacle main body 140 is optically transparent, and emits, toward the end surfaces of optical transmission members 130, the transmission light emitted from the light-emitting surfaces of light-emitting elements 111. Optical-receptacle main body 140 includes a plurality of first optical surfaces 141, a plurality of second optical surfaces 142, reflective surface 143, first fitting portions 144, and ferrule protrusions 145. Optical-receptacle main body 140 is formed using a material optically transparent to the light of wavelengths used for optical communications. Examples of such a material include transparent resins, such as polyetherimide (PEI), cyclic olefin resin, and the like.

First optical surfaces 141 are optical surfaces which allow, to enter the inside of optical-receptacle main body 140, the transmission light emitted by light-emitting elements 111, while causing the transmission light to be refracted. First optical surfaces 141 are also optical surfaces which emit, toward light-receiving elements 112, the reception light having traveled from optical transmission members 130 through the inside of optical receptacle 120, while causing the reception light to be refracted. As for the shape of first optical surface 141, first optical surface 141 is a convex lens surface that is convex toward light-emitting element 111 (light-receiving element 112) in the embodiment of the present invention. First optical surface 141 converts, into collimated light, the transmission light emitted by light-emitting element 111. Moreover, first optical surface 141 converges the collimated light (reception light) having traveled through the inside of optical receptacle 120. Furthermore, a plurality of (twelve) first optical surfaces 141 are aligned at the bottom surface of optical receptacle 120 in one row along the alignment direction of the light-emitting surfaces of light-emitting elements 111 and light-receiving elements 112 such that first optical surfaces 141 respectively face the light-emitting surfaces of light-emitting elements 111 and the light-receiving surfaces of light-receiving elements 112 in the embodiment of the present invention. Additionally, first optical surface 141 is circular in plan view. It is preferable that the central axes of first optical surfaces 141 be orthogonal to the light-emitting surfaces of light-emitting elements 111 and the light-receiving surfaces of light-receiving elements 112. It is also preferable that the central axes of first optical surfaces 141 coincide with the optical axes of the light rays emitted by light-emitting elements 111 (or with the rays of reception light to be incident on light-receiving element 112).

The light incident on first optical surfaces 141 travels toward reflective surface 143. The reception light emitted from first optical surfaces 141 travels toward light-receiving elements 112. Note that, when light-emitting elements 111 and light-receiving elements 112 are aligned in two or more rows, the number of rows of aligned first optical surfaces 141 is identical to that of light-emitting elements 111 and light-receiving elements 112.

As illustrated in FIG. 3B, six of twelve first optical surfaces 141 on the right side in the illustration are used as transmitting-side first optical surfaces 141, and the other six first optical surfaces 141 on the left side are used as receiving-side first optical surfaces 141 in the embodiment of the present invention. That is, the transmission light from light-emitting elements 111 is incident on six transmitting-side first optical surfaces 141 on the right side in the illustration, and the reception light having traveled through the inside of optical-receptacle main body 140 is emitted from six receiving-side first optical surfaces 141 on the left side in the illustration. As described above, in optical-receptacle main body 140 according to the embodiment of the present invention, twelve first optical surfaces 141 are divided equally, and one region of optical-receptacle main body 140 with respect to an assumed plane being orthogonal to board 113 and being located at the middle of optical-receptacle main body 140 functions as the transmitting side and the other region functions as the receiving side.

Second optical surfaces 142 are optical surfaces which emit, toward the end surfaces of optical transmission members 130, the transmission light incident on first optical surfaces 141 and reflected on reflective surface 143. Second optical surfaces 142 are also optical surfaces which allow, to enter the inside of optical receptacle 120, the reception light emitted from the end surfaces of optical transmission members 130, while causing the reception light to be refracted. As for the shape of second optical surface 142, second optical surface 142 is a convex lens surface that is convex toward the end surface of optical transmission member 130 in the embodiment of the present invention. Second optical surface 142 converges, toward the end surface of optical transmission member 130, the transmission light having traveled through the inside of optical-receptacle main body 140, and also converts the reception light emitted from optical transmission member 130 into collimated light. Additionally, in the embodiment of the present invention, a plurality of (twelve) second optical surfaces 142 are aligned at the front of optical receptacle 120 in one row along the alignment direction of optical transmission members 130 such that second optical surfaces 142 respectively face the end surfaces of optical transmission members 130. Additionally, second optical surface 142 is circular in plan view.

It is preferable that the central axes of second optical surfaces 142 be orthogonal to the end surfaces of optical transmission members 130. It is also preferable that the central axes of second optical surfaces 142 coincide with the optical axes of the light rays emitted from optical transmission members 130. Note that, when optical transmission members 130 are aligned in two or more rows, the number of rows of aligned second optical surfaces 142 is identical to that of optical transmission members 130.

Note that, as illustrated in FIG. 3C, six of twelve second optical surfaces 142 on the right side in the illustration are used as transmitting-side second optical surfaces 142, and the other six second optical surfaces 142 on the left side are used as receiving-side second optical surfaces 142 in the embodiment of the present invention. That is, the reception light having traveled through the inside of optical receptacle 120 is emitted from six transmitting-side second optical surfaces 142 on the right side in the illustration, and the transmission light emitted from optical transmission members 130 is incident on six receiving-side second optical surfaces 142 on the left side in the illustration.

First fitting portions 144 are fitted to second fitting portions 152 of supporting member 150. The shape of each of first fitting portions 144 is not particularly limited as long as first fitting portions 144 can fulfil the above-mentioned function. Optical-receptacle main body 140 is thus supported by supporting member 150. First fitting portions 144 are disposed in or on a surface of optical-receptacle main body 140 other than in or on the bottom surface of optical-receptacle main body 140 at which first optical surfaces 141 are disposed and other than in or on the front surface of optical-receptacle main body 140 at which second optical surfaces 142 are disposed. First fitting portions 144 may be disposed in or on the top panel, lateral surface, or rear surface. In the embodiment of the present invention, first fitting portions 144 are disposed in the top panel of optical-receptacle main body 140. Additionally, the shapes and number of first fitting portions 144 are not particularly limited as long as first fitting portions 144 can fulfil the above-mentioned function. In the embodiment of the present invention, the shape of each of first fitting portions 144 is a cylindrical recess being open at the top panel of optical-receptacle main body 140. The number of first fitting portions 144 is two in the embodiment of the present invention.

Reflective surface 143 is disposed on the top-panel side of the optical-receptacle main body, and reflects the transmission light incident on first optical surfaces 141 toward second optical surfaces 142. Reflective surface 143 also reflects the reception light incident on second optical surfaces 142 toward first optical surfaces 141. In the embodiment of the present invention, reflective surface 143 is inclined such that the distance from reflective surface 143 to second optical surfaces 142 (or optical transmission members 130) increases from the top panel to the bottom surface of optical receptacle 120. The inclination angle of reflective surface 143 is 45 degrees with respect to the optical axis of light 1 incident on first optical surfaces 141 and with respect to the optical axis of light incident on second optical surfaces 142.

Ferrule protrusions 145 are fitted in the recesses provided in ferrule 132. The end surfaces of optical transmission members 130 are thus positioned to optical-receptacle main body 140. Ferrule protrusions 145 are disposed on the opposite sides of the row of second optical surfaces 142.

Note that, although not illustrated in particular, a third alignment mark may also be formed on optical-receptacle main body 140. The third alignment mark may be used for the below-mentioned positioning of optical module 100.

Figure 4A:
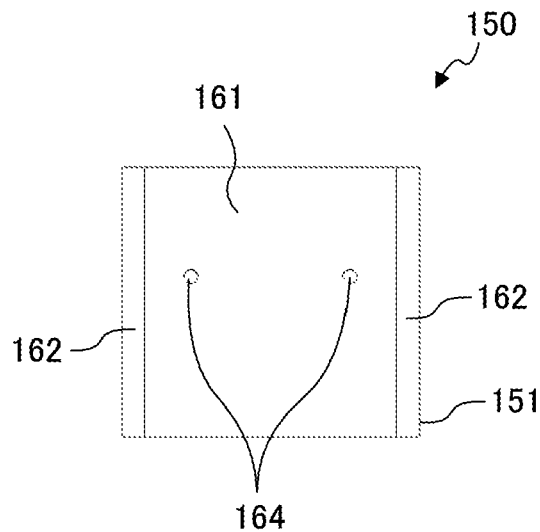
FIGS. 4A to 4D illustrate a configuration of a supporting member.
Figure 4C:
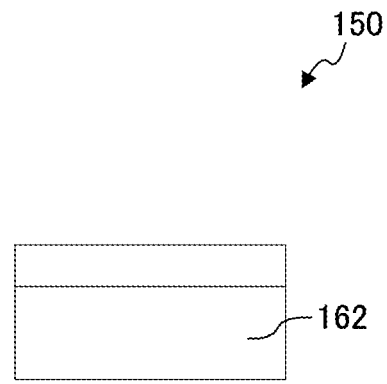
Figure 4B:
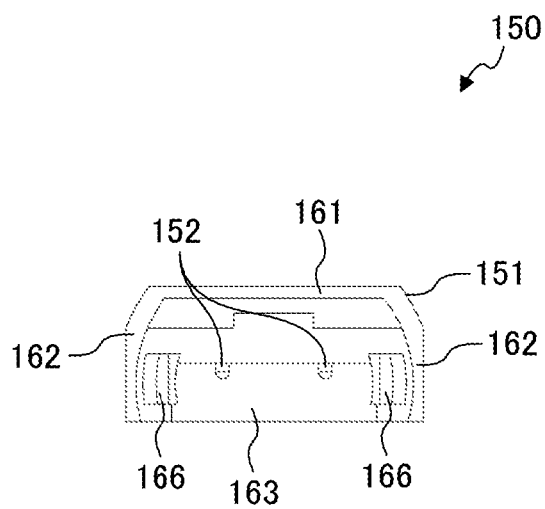
Figure 4D:
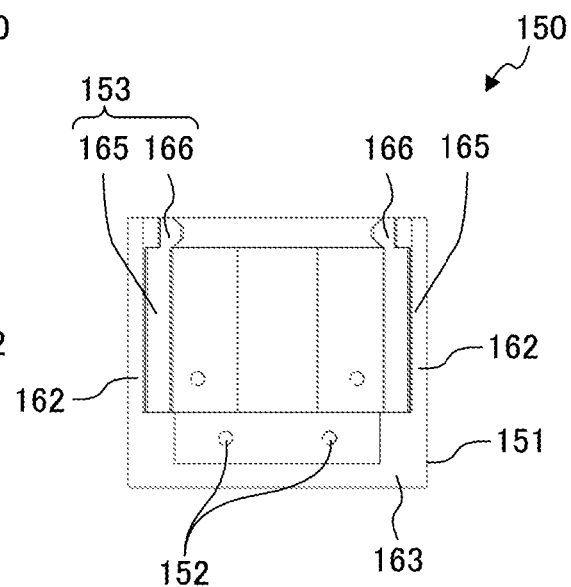

FIGS. 4A to 4D illustrate a configuration of supporting member 150. FIG. 4A is a plan view of supporting member 150, FIG. 4B is a front view of supporting member 150, FIG. 4C is a right side view of supporting member 150, and FIG. 4D is a bottom view of supporting member 150.

Supporting member 150 supports optical-receptacle main body 140 such that board 113 and optical-receptacle main body 140 are spaced apart from each other. As illustrated in FIGS. 4A to 4D, supporting member 150 includes supporting-member main body 151 and second fitting portions 152 disposed on the inner side of supporting-member main body 151. Supporting member 150 may also include detachably-attaching parts 153 used for fixing optical transmission members 130 to optical receptacle 120. Supporting member 150 may be formed of an optically-transparent or optically-untransparent material. In the embodiment of the present invention, supporting member 150 is formed of an optically transparent resin, such as polycarbonate (PC), polyether imide (PEI), polyether sulfone (PES), or the like.

Supporting-member main body 151 supports optical-receptacle main body 140 such that board 113 and optical-receptacle main body 140 are spaced apart from each other. The shape of supporting-member main body 151 is not particularly limited as long as supporting-member main body 151 can fulfil the above-mentioned function. In the embodiment of the present invention, the shape of supporting-member main body 151 includes top plate 161, a pair of side plates 162, and back plate 163 connecting top plate 161 to the pair of side plates 162. The undersurfaces of the pair of side plates 162 and the undersurface of back plate 163 function as installation surface 162a for installation of optical receptacle 120 on board 113. Second fitting portions 152 are disposed on the inner side of top plate 161, and second alignment marks 164 are formed on the outer side of top plate 161. Moreover, detachably-attaching parts 153 are disposed on the pair of side plates 162. The height of the pair of side plates 162 is greater than the height of optical-receptacle main body 140. With this configuration, optical-receptacle main body 140 is disposed on the side of supporting-member 150 with respect to installation surface 162a. In other words, when optical-receptacle main body 140 is supported by supporting-member main body 151 via second fitting portions 152, a space is formed in a region below optical-receptacle main body 140.

Second fitting portions 152 are fitted in first fitting portions 144 of optical-receptacle main body 140. Thus, supporting member 150 supports optical-receptacle main body 140. Second fitting portions 152 are substantially complementary in shape to first fitting portions 144 of optical-receptacle main body 140, and are disposed at positions corresponding to first fitting portions 144. That is, second fitting portions 152 each have the shape of a substantially circular cylinder and are disposed on top plate 161.

Detachably-attaching parts 153 are a part for fixation of ferrule 132 to supporting member 150. The configuration of each of detachably-attaching parts 153 is not particularly limited as long as detachably-attaching parts 153 can fulfil the above-mentioned function. For example, detachably-attaching parts 153 include detachably-attaching linear protrusions 165 that are disposed respectively on the pair of side plates 162 and that are used for positioning of ferrule 132, and detachably-attaching parts 153 also include detachably-attaching protrusions 166 that are disposed at one ends of detachably-attaching linear protrusions 165 on the side of ferrule 132 and that are to be engaged with detachably-attaching recesses 168 of ferrule 132.

Second alignment marks 164 are used for the below-mentioned positioning of optical module 100, and serve as a basis for positioning optical receptacle 120 to board 113. The configuration of second alignment marks 164 is not particularly limited as long as second alignment marks 164 can fulfil the above-mentioned function. Second alignment marks 164 may be recesses formed in top plate 161, protrusions formed on top plate 161, or marks provided by painting. In addition, the shape of each of second alignment marks 164 as seen in plan view is not particularly limited, and may be circular or polygonal. In the embodiment of the present invention, second alignment marks 164 are disposed to overlap first alignment marks 114 in plan view of optical module 100.

(Method for Producing Optical Module)

A method for producing optical module 100 is not particularly limited. Optical module 100 according to the embodiment of the present invention can be produced by the following method, for example. To begin with, optical receptacle 120 is produced. The method for producing optical receptacle 120 is not particularly limited. Optical receptacle 120 is produced, for example, by injection molding. Optical receptacle 120 is produced by molding optical-receptacle main body 140 and supporting member 150 separately by injection molding, and then attaching optical-receptacle main body 140 to supporting member 150. Specifically, optical receptacle 120 is assembled by fitting second fitting portions 152 of supporting member 150 into first fitting portions 144 of the optical-receptacle main body. During assembly, optical-receptacle main body 140 is disposed on the side of supporting member 150 with respect to installation surface 162a since the lengths in the height direction of side plates 162 of supporting member 150 is greater than the length in the height direction of optical-receptacle main body 140. Subsequently, optical receptacle 120 prepared by assembling supporting member 150 and optical-receptacle main body 140 is fixed to board 113 on which light-emitting elements 111 and light-receiving elements 112 are mounted, and consequently, optical module 100 can be produced.

Figure 5A:
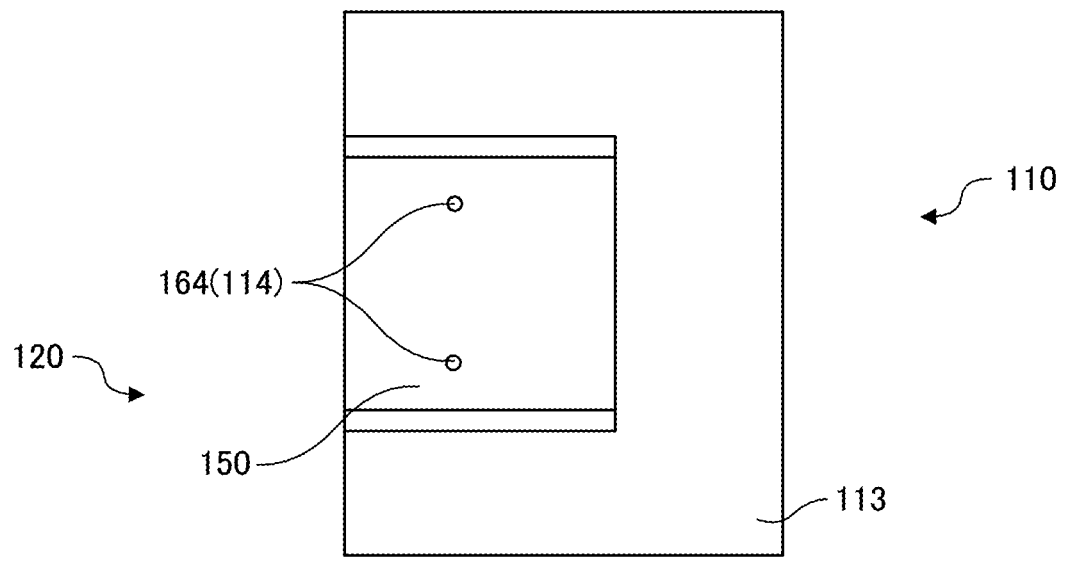
FIGS. 5A and 5B are explanatory views for explaining positioning of the optical receptacle and a board.
Figure 5B:
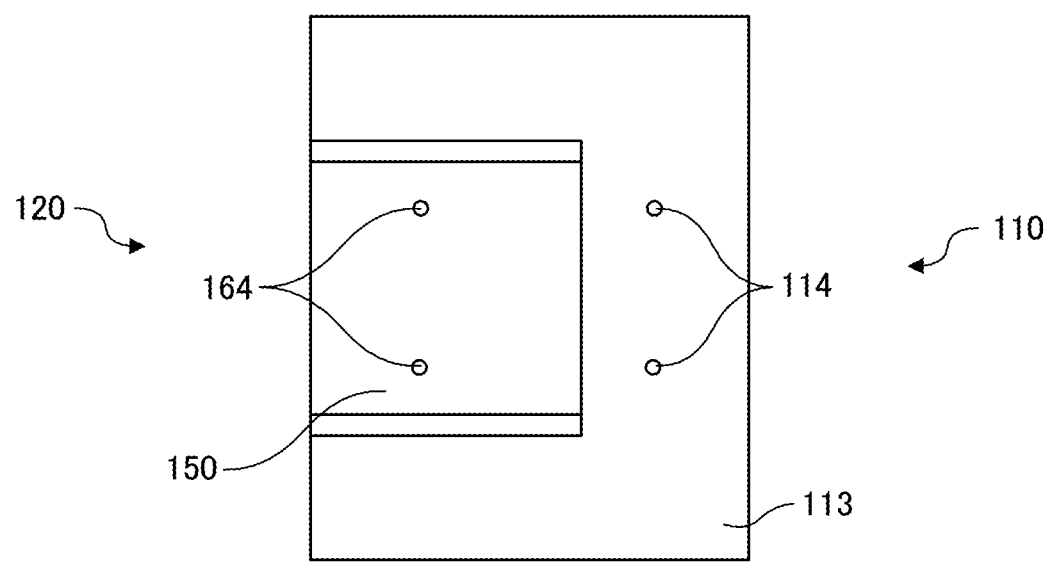

Here, a description will be made of a method for positioning photoelectric conversion device 110 and optical receptacle 120 to each other. FIGS. 5A and 5B are explanatory views for explaining the method for positioning photoelectric conversion device 110 and optical receptacle 120 to each other. FIG. 5A is an explanatory view for explaining the method for positioning photoelectric conversion device 110 and optical receptacle 120 to each other in the present embodiment, and FIG. 5B is an explanatory view for explaining another method for positioning photoelectric conversion device 110 and optical receptacle 120 to each other in another embodiment of the present invention.

As illustrated in FIG. 5A, photoelectric conversion device 110 and optical receptacle 120 are positioned to each other based on first alignment marks 114 formed on board 113 and based on second alignment marks 164 formed on supporting member 150. As mentioned above, first alignment marks 114 and second alignment marks 164 are disposed to overlap each other in plan view of optical module 100 in the embodiment of the present invention. Accordingly, optical receptacle 120 is positioned to board 113 such that first alignment marks 114 and second alignment marks 164 overlap each other when optical module 100 is seen from the side of supporting member 150. Then, board 113 and optical receptacle 120 (supporting member 150) are fixed together with an adhesive, for example, with first alignment marks 114 and second alignment marks 164 overlapping each other.

In this case, it is preferable that optical-receptacle main body 140 and supporting member 150 be produced such that the following Expression 1 is satisfied:

$$A+B+C \leq \mu m \quad \text{(Expression 1)}$$

wherein "A" denotes an error (μm) in the relative positions of first optical surfaces 141 and first fitting portions 144 in the direction along the surface of board 113, "B" denotes a clearance (μm) between first fitting portions 144 of first optical surface 141 and second fitting portions 152 of supporting member 150 in the direction along the surface of board 113, and "C" denotes an error (μm) in the relative positions of second fitting portions 152 and second alignment marks 164 of supporting member 150 in the direction along the surface of board 113.

In this expression, the left side of Expression 1 denotes the amount of displacement between the optical axes of the transmission light emitted by light-emitting elements 111 and the centers of optical transmission members 130 in optical module 100. The right side of Expression 1 denotes the allowable width (tolerance width) of the displacement between the optical axes of the transmission light emitted by light-emitting elements 111 and the centers of optical transmission members 130. That is, optical-receptacle main body 140 and supporting member 150 are produced such that the amount of displacement between the optical axes of the transmission light (or the reception light) and the centers of optical transmission members 130 is equal to or smaller than the tolerance width.

Additionally or alternatively, as illustrated in FIG. 5B, when first alignment marks 114 are disposed on the side opposite to optical transmission members 130 as seen from the photoelectric conversion elements (light-emitting elements 111 and light-receiving elements 112), optical receptacle 120 is positioned to board 113 such that the positional relationship between second alignment marks 164 and first alignment marks 114 is a predetermined positional relationship. Thus, supporting member 150 does not have to be optically transparent when first alignment marks 114 are disposed on the side opposite to optical transmission members 130 as seen from the photoelectric conversion elements (light-emitting elements 111 and light-receiving elements 112). Note that, it is preferable, also in this case, that optical-receptacle main body 140 and supporting member 150 be produced such that the aforementioned Expression 1 is satisfied.

Note that, although not illustrated in particular, when board 113 and optical receptacle 120 are positioned to each other using the third alignment mark provided on optical-receptacle main body 140, first alignment marks 114 are disposed on the side opposite to optical transmission members 130 as seen from the photoelectric conversion elements (light-emitting elements 111 and light-receiving elements 112). Then, optical receptacle 120 is positioned to board 113 such that the positional relationship between the third alignment mark and first alignment marks 114 is a predetermined positional relationship. It is preferable in this case that optical-receptacle main body 140 be produced such that the following Expression 2 is satisfied:

$$D \leq 20 \ \mu m \quad \text{(Expression 2)}$$

wherein "D" denotes an error (μm) in the relative positions between first optical surfaces 141 and the third alignment mark.

In this expression, the left side of Expression 2 denotes the amount of displacement between the optical axes of the transmission light emitted by light-emitting elements 111 and the centers of optical transmission members 130 in optical module 100. The right side of Expression 2 denotes the allowable width (tolerance width) of the displacement between the optical axes of the transmission light emitted by light-emitting elements 111 and the centers of optical transmission members 130. That is, optical-receptacle main body 140 is produced such that the amount of displacement between the optical axes of the transmission light and the centers of optical transmission members 130 is equal to or smaller than the tolerance width.

(Effect)

As described above, when optical receptacle 120 according to the embodiment of the present invention is disposed on board 113, there is a space between board 113 and the optical-receptacle main body since optical-receptacle main body 140 is not in contact with board 113. Therefore, in optical receptacle 120 according to the embodiment of the present invention, a greater number of degrees of freedom for arrangement (design) of other optical components, electronic components, and/or the like can be achieved.

Note that, although first fitting portions 144 are recesses and second fitting protrusions 152 are protrusions in the embodiment of the present invention, first fitting portions 144 may also be protrusions and second fitting portions 152 may also be recesses.

The present patent application claims the benefit of priority based on Japanese Patent Application No. 2016-068398 filed on Mar. 30, 2016. The disclosures of the specifications, drawings and abstracts of those Japanese Patent Applications are incorporated in the specification of the present application by reference in its entirety.

INDUSTRIAL APPLICABILITY

The optical receptacle and optical module according to the present invention are useful for optical communications using an optical transmission member, for example.

REFERENCE SIGNS LIST

100 Optical module
110 Photoelectric conversion device
111 Light-emitting element
112 Light-receiving element
113 Board
114 First alignment mark
120 Optical receptacle
130 Optical transmission member
132 Ferrule
133 Adhesive inlet
140 Optical-receptacle main body
141 First optical surface
142 Second optical surface
143 Reflective surface
144 First fitting portion
145 Ferrule protrusion
150 Supporting member
151 Supporting-member main body
152 Second fitting portion
153 Detachably-attaching part
161 Top plate
162 Side plate
163 Back plate
164 Second alignment mark
165 Detachably-attaching linear protrusion
166 Detachably-attaching protrusion
167 Detachably-attaching linear recess
168 Detachably-attaching recess
169 Ferrule main body
170 Ferrule housing

The invention claimed is:

1. An optical receptacle configured to be disposed between a photoelectric conversion device and an optical transmission member, the photoelectric conversion device including a board and a photoelectric conversion element disposed on the board, the optical receptacle being configured to optically couple together the photoelectric conversion element and an end surface of the optical transmission member, the optical receptacle comprising:
    an optical-receptacle main body; and
    a supporting member configured to support the optical-receptacle main body,
    wherein the optical-receptacle main body includes:
        a first optical surface configured to allow incidence of transmission light emitted by the photoelectric conversion element, and to emit, toward the photoelectric conversion element, reception light that has been emitted from the end surface of the optical transmission member and has passed through an inside of the optical-receptacle main body,
        a second optical surface configured to emit, toward the optical transmission member, the transmission light that has been emitted by the photoelectric conversion element and has passed through the inside of the optical-receptacle main body, and to allow incidence of the reception light emitted from the optical transmission member, and
        a first fitting portion disposed in or on a surface of the optical-receptacle main body other than in or on surfaces of the optical-receptacle main body at which the first optical surface and the second optical surface are disposed,
    wherein the supporting member includes:
        a supporting-member main body including an installation surface for the supporting member to be installed on the board, and
        a second fitting portion disposed on an inner side of the supporting-member main body at a position corresponding to the first fitting portion, the second fitting portion being fitted in or to the first fitting portion, and
    wherein the optical-receptacle main body is disposed on a side of the supporting member with respect to the installation surface in such a manner that the supporting member is not between the optical-receptacle main body and the photoelectric conversion device.

2. The optical receptacle according to claim 1, wherein the supporting member further includes a detachably-attaching part configured to detachably attach the optical transmission member to the supporting member in order that the end surface of the optical transmission member and the second optical surface are disposed to face each other.

3. The optical receptacle according to claim 1, wherein the optical-receptacle main body further includes a reflective surface configured to reflect, toward the second optical surface, the transmission light incident on the first optical surface, and to reflect, toward the first optical surface, the reception light incident on the second optical surface.

4. An optical module, comprising:
a photoelectric conversion device including a board and a photoelectric conversion element disposed on the board; and
the optical receptacle according to claim 1, wherein
the board and the optical-receptacle main body are spaced apart from each other.

5. A method for producing the optical module according to claim 4, the method comprising:
preparing the optical receptacle by fitting together the first fitting portion of the optical-receptacle main body and the second fitting portion of the supporting member; and
fixing the optical receptacle to the photoelectric conversion device such that the board and the optical-receptacle main body are spaced apart from each other.

6. The optical receptacle according to claim 2, wherein
the optical-receptacle main body further includes a reflective surface configured to reflect, toward the second optical surface, the transmission light incident on the first optical surface, and to reflect, toward the first optical surface, the reception light incident on the second optical surface.

7. An optical module, comprising:
a photoelectric conversion device including a board and a photoelectric conversion element disposed on the board; and
the optical receptacle according to claim 2, wherein
the board and the optical-receptacle main body are spaced apart from each other.

8. An optical module, comprising:
a photoelectric conversion device including a board and a photoelectric conversion element disposed on the board; and
the optical receptacle according to claim 3, wherein
the board and the optical-receptacle main body are spaced apart from each other.

9. An optical module, comprising:
a photoelectric conversion device including a board and a photoelectric conversion element disposed on the board; and
the optical receptacle according to claim 6, wherein
the board and the optical-receptacle main body are spaced apart from each other.

10. A method for producing the optical module according to claim 7, the method comprising:
preparing the optical receptacle by fitting together the first fitting portion of the optical-receptacle main body and the second fitting portion of the supporting member; and
fixing the optical receptacle to the photoelectric conversion device such that the board and the optical-receptacle main body are spaced apart from each other.

11. A method for producing the optical module according to claim 8, the method comprising:
preparing the optical receptacle by fitting together the first fitting portion of the optical-receptacle main body and the second fitting portion of the supporting member; and
fixing the optical receptacle to the photoelectric conversion device such that the board and the optical-receptacle main body are spaced apart from each other and the supporting member is not between the optical-receptacle main body and the photoelectric conversion device.

12. A method for producing the optical module according to claim 9, the method comprising:
preparing the optical receptacle by fitting together the first fitting portion of the optical-receptacle main body and the second fitting portion of the supporting member; and
fixing the optical receptacle to the photoelectric conversion device such that the board and the optical-receptacle main body are spaced apart from each other.

* * * * *